Patented June 19, 1923.

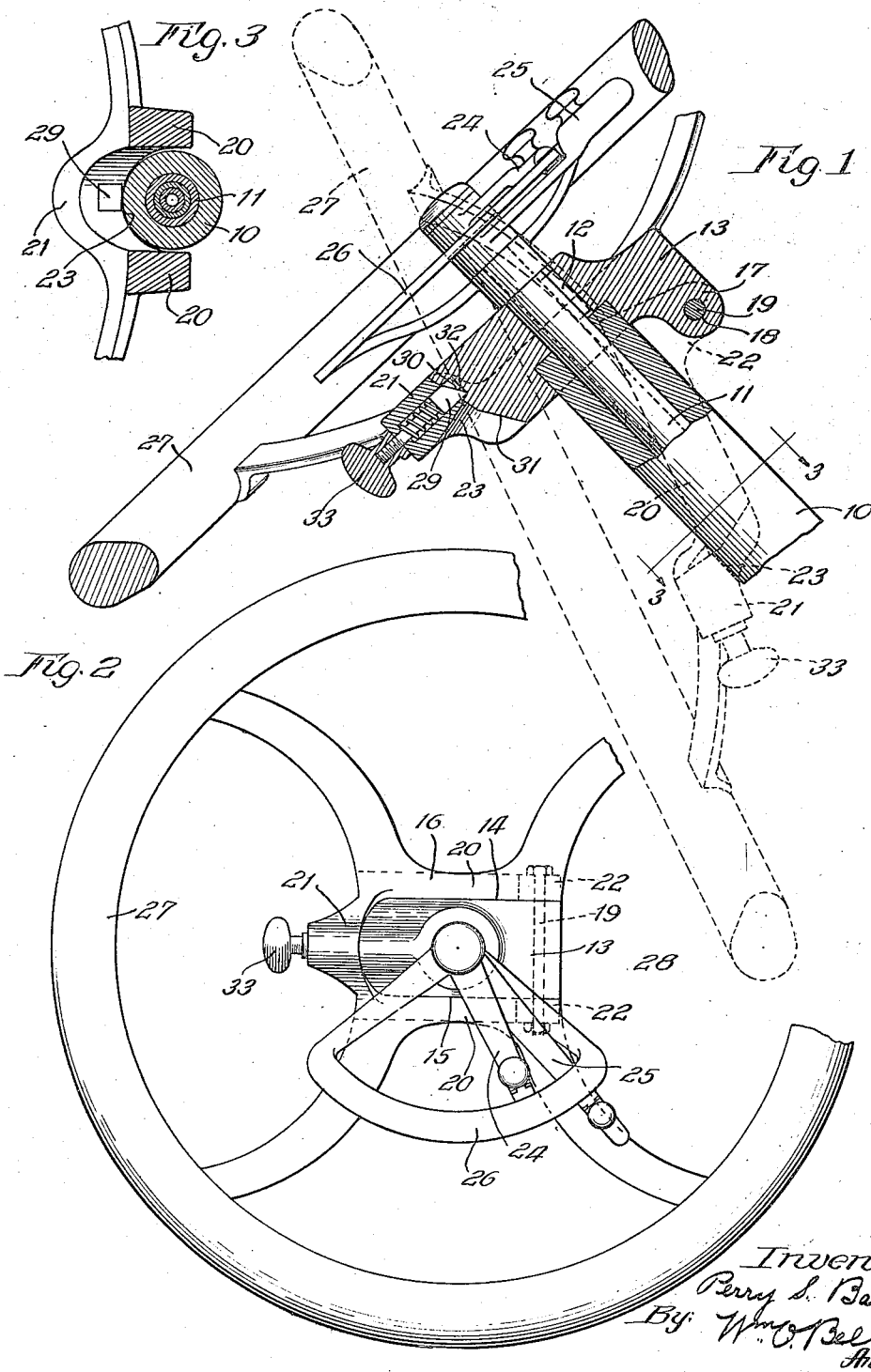

1,459,493

UNITED STATES PATENT OFFICE.

PERRY S. BAUER, OF CHICAGO, ILLINOIS.

TILTING STEERING WHEEL.

Application filed January 28, 1922. Serial No. 532,363.

*To all whom it may concern:*

Be it known that I, PERRY S. BAUER, a citizen of the United States, residing at Chicago, in the county of Cook and State of Illinois, have invented certain new and useful Improvements in Tilting Steering Wheels, of which the following is a specification.

This invention relates to steering gears for automobiles and has for its principal object to permit the steering wheel to be tilted or swung to a position out of the way of the operator in entering or leaving the car, and to provide greater clearance than has been given in prior structures.

Another object of the invention is to give the wheel both a forward and downward movement in tilting, so that it may be removed from the path of the operator's legs as well as the upper portion of his body.

Further objects will become apparent as the description is read in connection with the accompanying drawing showing a selected embodiment of the invention, and in which—

Fig. 1 is a vertical sectional view in a plane parallel to the length of the vehicle;

Fig. 2 is a plan view; and

Fig. 3 is a section on the line 3—3 of Fig. 1 showing the relationship between the steering column and the steering wheel when the latter is in tilted position.

Referring to the drawings, 10 indicates a steering column which is usually inclined as indicated in Fig. 1. A steering shaft 11 is mounted to rotate in this column, and is connected at its lower end with the guiding wheels of the vehicle. Secured to the upper end of the steering shaft by the key 12 is an element which I will call, for convenience, the inner hub part 13. As here shown, this inner hub part is generally rectangular in shape having parallel sides 14 and 15 to cooperate with corresponding sides on the outer hub part 16 of the steering wheel. The inner hub part 13 is provided with a depending projection 17 at its front end, which has a horizontal passage 18 adapted to receive the bolt 19 by which the outer hub part 16 is pivoted to the inner hub part 13. The outer hub part is here shown in the form of a yoke having the side members 20 connected at their rear ends by the bow 21. The front ends of the side members 20 have depending projections 22 corresponding to the projection 17 and are perforated to receive the bolt 19 for the purpose above indicated. I prefer to offset the bow 21 upwardly from the side members 20 as indicated in Fig. 1, and curve its lower surface 23 so as to provide clearance for the rear side of the steering column 10 when the wheel is folded to the position indicated in the dotted lines in Fig. 1 so that the bow will permit the side members 20 of the outer hub part to straddle the steering column as indicated in Fig. 3.

By pivoting the outer hub part to the inner hub part at the low point represented by the bolt 19, the steering wheel, when tilted, moves both forwardly and downwardly, as will be seen from a comparison of the solid and dotted line positions in Fig. 1, and by offsetting the bow 21 and curving its under surface to correspond with the curvature of the steering post, the wheel is permitted to fold far to the front, as indicated in the dotted line position in Fig. 1. By this construction, the lower portion of the wheel passes far enough to the front to be out of the way of the operator's knees while the upper portion of the wheel is sufficiently far to the front, and also sufficiently low to permit his body to lean forward, as is necessary in alighting from most automobiles on account of the lack of head room.

The present embodiment of the invention is illustrated in connection with control levers 24 and 25 for spark and fuel, and the segment 26, which in many automobiles are located above the steering wheel, and to one side, as shown. In order to provide clearance for these parts, or any others of a similar character, I connect the outer hub part 16 with the rim 27 of the steering wheel by a plurality of curved spokes here shown in two pairs flaring outwardly from the opposite ends of the side members 20, and connected at their outer ends to the rim 27. This arrangement provides a large open space 28 through which the segment 26 and the control levers 24 and 25 are passed freely when the steering wheel is moved from the solid line position in Fig. 1 to the dotted line position in that figure. From this it will be clear to those skilled in the art how the spokes may be arranged to provide clearance for any similar equipment in the various makes of automobiles.

The steering wheel is held in operative position by a spring pressed bolt 29 here shown as carried by the yoke 21, and being received in a socket 30 in the rear end of the inner hub part 13. The end of the bolt, and the lower portion of the rear end of the hub part 13 are provided with inclined surfaces 31 and 32 to permit the bolt to automatically ride to the socket 30 as the wheel is moved from folded to operative position. The bolt is equipped with a suitable knob 33 by which it may be withdrawn when it is desired to fold the wheel to the out of the way position. This means of securing the wheel in operative position, however, is merely illustrative as a great variety of devices will serve the purpose as well.

The yoke form of the outer hub part 16 makes it a very simple matter to compensate for wear between the faces 14 and 15 of the inner hub part and the corresponding faces of the outer hub part, by merely providing a bolt 19 with suitable means for drawing the projections 22 against the projection 17 of the inner hub part.

I am aware that changes in the form and proportion of parts, and in the details of construction of my invention may be made without departing from the spirit or sacrificing any of the advantages thereof, and I reserve the right to make all such changes as fairly fall within the scope of the following claims.

I claim:

1. In an automobile, a steering column, a steering shaft rotatably mounted therein, an inner hub part of the steering wheel secured to said steering shaft, a steering wheel including a bow-shaped outer hub part embracing the inner hub part, a pivot connecting the ends of the bow to the inner hub part in front of the steering column, the connecting portion of the bow being curved upwardly and rearwardly to provide clearance for the steering column, and means for securing the wheel against tilting movement.

2. In an automobile, a steering column, a steering shaft therein, a hub portion of a steering wheel secured to said steering shaft and having a depending projection at its front end, a steering wheel pivoted to said depending projection and embodying a laterally offset outer hub portion providing clearance for the steering column on the opposite side from said depending projection, and means to secure said steering wheel against pivotal movement.

3. In an automobile, a steering column, a steering shaft mounted to rotate in said column, a hub portion of a steering wheel secured to said steering shaft and having a depending projection at its front end, an outer hub part of a steering wheel embracing said inner hub part and having corresponding depending projections pivoted to the depending projection on said inner hub part, said outer hub part having an offset portion with a curved face adapted to provide clearance for said steering column, and means for securing said outer hub part against pivotal movement.

4. In an automobile, a steering column, a steering shaft rotatably mounted therein, an inner hub portion of a steering wheel rigidly connected with said shaft and provided with a depending projection at its front end, a steering wheel comprising an outer hub portion, spokes and a rim, said outer hub portion being pivoted to said depending projection and being offset to provide clearance for said steering column, and said spokes flaring outwardly from said outer hub portion to said rim, and means for securing said steering wheel against pivotal movement.

PERRY S. BAUER.